US010141811B2

(12) United States Patent
Urabe et al.

(10) Patent No.: US 10,141,811 B2
(45) Date of Patent: Nov. 27, 2018

(54) STATOR FOR ELECTRIC MOTOR, ELECTRIC MOTOR, AND AIR CONDITIONER

(71) Applicant: Mitsubishi Electric Corporation, Tokyo (JP)

(72) Inventors: Yuto Urabe, Tokyo (JP); Tomoaki Oikawa, Tokyo (JP); Mineo Yamamoto, Tokyo (JP); Hiroyuki Ishii, Tokyo (JP); Hiroki Aso, Tokyo (JP); Junichiro Oya, Tokyo (JP); Takaya Shimokawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/509,252

(22) PCT Filed: Oct. 24, 2014

(86) PCT No.: PCT/JP2014/078418
§ 371 (c)(1),
(2) Date: Mar. 7, 2017

(87) PCT Pub. No.: WO2016/063428
PCT Pub. Date: Apr. 28, 2016

(65) Prior Publication Data
US 2017/0279332 A1  Sep. 28, 2017

(51) Int. Cl.
*H02K 5/22*     (2006.01)
*F24F 1/00*     (2011.01)
(Continued)

(52) U.S. Cl.
CPC .......... *H02K 5/225* (2013.01); *F24F 1/0003* (2013.01); *F24F 1/20* (2013.01); *F24F 7/007* (2013.01);
(Continued)

(58) Field of Classification Search
CPC .......... H02K 5/22; H02K 11/21; H02K 15/02; H02K 15/08; H02K 5/02; H02K 29/08; H02K 3/522; H02K 5/225; F25D 17/06
(Continued)

(56) References Cited

U.S. PATENT DOCUMENTS

| 2015/0159656 A1* | 6/2015 | Urabe | F04D 13/064 |
| | | | 165/104.31 |
| 2015/0263581 A1* | 9/2015 | Yamamoto | H02K 29/08 |
| | | | 310/43 |
| 2016/0036279 A1* | 2/2016 | Aso | H02K 3/522 |
| | | | 310/43 |

FOREIGN PATENT DOCUMENTS

| JP | 06-014774 B2 | 2/1994 |
| JP | 2010-130833 A | 6/2010 |
| JP | 2010-273525 A | 12/2010 |
| JP | 2014-082847 A | 5/2014 |

(Continued)

OTHER PUBLICATIONS

Office action dated Oct. 3, 2017 corresponding to JP patent application No. 2016-555044 (and English machine translation attached).
(Continued)

*Primary Examiner* — Naishadh Desai
(74) *Attorney, Agent, or Firm* — Posz Law Group, PLC

(57) ABSTRACT

A stator for an electric motor includes: an annular lead wiring part attached to one axial end of the stator and routing a power lead to a winding of the stator; and a lead-out part provided on the radially outer side of the annular lead wiring part and leading out the power lead to the radial outside of the lead wiring part. The lead wiring part is formed such that the curvature of the inner diameter is different near the lead-out part compared with the remaining portion, and the radius of the inner diameter of the lead wiring part is largest at a portion other than near the lead-out part.

6 Claims, 18 Drawing Sheets

(51) Int. Cl.
*F24F 7/007* (2006.01)
*H02K 3/52* (2006.01)
*H02K 5/08* (2006.01)
*H02K 15/095* (2006.01)
*F24F 1/20* (2011.01)
*H02K 5/10* (2006.01)

(52) U.S. Cl.
CPC .............. *H02K 3/522* (2013.01); *H02K 5/08* (2013.01); *H02K 15/095* (2013.01); *H02K 5/10* (2013.01); *H02K 2203/03* (2013.01); *H02K 2203/06* (2013.01); *H02K 2203/09* (2013.01)

(58) Field of Classification Search
USPC .......................................................... 310/71
See application file for complete search history.

(56) References Cited

FOREIGN PATENT DOCUMENTS

| JP | 2014-087219 A | 5/2014 |
| WO | 2014/061359 A1 | 4/2014 |
| WO | 2014/132364 A1 | 9/2014 |
| WO | 2014/148537 A1 | 9/2014 |

OTHER PUBLICATIONS

International Search Report of the International Searching Authority dated Jan. 20, 2015 for the corresponding international application No. PCT/JP2014/078418 (and English translation).

Office Action dated Sep. 3, 2018 issued in corresponding CN patent application No. 201480082836.9 (and English translation).

* cited by examiner

STATOR FOR ELECTRIC MOTOR, ELECTRIC MOTOR, AND AIR CONDITIONER

CROSS REFERENCE TO RELATED APPLICATION

This application is a U.S. national stage application of International Patent Application No. PCT/JP2014/078418 filed on Oct. 24, 2014, the disclosure of which is incorporated herein by reference.

TECHNICAL FIELD

The present invention relates to a stator for an electric motor, an electric motor, and an air conditioner.

BACKGROUND

Molded electric motors have been adopted as the conventional indoor-unit fan motors or outdoor-unit fan motors used in air conditioners. With a molded electric motor, an outer cover is formed by molding a mold resin onto the stator, and the rotor is arranged to be rotatable on the inner circumference side of the outer cover. The molded electric motor is equipped with a lead-out portion for leading out leads from the stator and a wiring substrate to the outside of the molded electric motor. Here, this lead-out portion is molded as one unit with the stator and wiring parts by using a mold resin.

However, in the case of such a structure, water can easily enter through a gap or interface between the outer cover and the lead-out portion of the molded electric motor or a gap or interface between the lead-out portion and leads. For this reason, there has been a problem in that a secondary process, such as coating with a sealing material or fixing with a tape, is required as a measure to ensure waterproof properties.

Patent Literature 1 listed below discloses a conventional electric motor that includes a lead wiring part that prevents water from reaching a substrate after molding a resin onto the stator. A substrate on which electronic parts are mounted can be attached to the lead wiring part, and the lead wiring part is disposed on the stator. Further, the lead wiring part is configured to route power leads for supplying power to the stator and to route sensor leads for supplying power to the substrate and supplying positional information about the rotor to the substrate.

Further, Patent Literature 2 listed below discloses a stator for a brushless electric motor that includes a stator core; windings wound around the stator core with an insulating layer interposed therebetween; a printed board that has a drive circuit part and a position sensor mounted thereon and also includes a notch portion in a size almost equal to a lead-out bush for protecting the lead-out lines; and the lead-out bush, which is fitted in the notch portion of the printed board and holds the lead-out lines. The respective parts are integrally molded and solidified by use of a thermosetting resin that functions as an electric insulator.

PATENT LITERATURE

Patent Literature 1: Japanese Patent Application Laid-open No. 2010-273525
Patent Literature 2: Japanese Examined Patent Application Publication No. H06-014774

However, in the case of the stator for the conventional molded electric motor disclosed in Patent Literature 1 mentioned above, the lead-out portion is formed integrally with the lead wiring part, and it is disposed on the outer circumference side of the stator core. In this case, a connection portion is formed between the lead-out portion and the lead wiring part, and the interface between this connection portion and the mold material provides a passage through which water can enter. Consequently, the connection portion serves as a water infiltration passage through which water that has entered from the lead-out portion infiltrates, and this water reaches the substrate and the stator. If water reaches the substrate, the water is pooled between the power leads and the substrate. When current flows in the substrate, pattern corrosion develops and pattern cut is caused on the substrate. As a result, there is a problem in that the position of the rotor can become difficult to detect, and the electric motor may become inoperable. Further, once the lead-out portion and the lead wiring part are separated from each other, positioning of the lead-out portion may become unstable. Further, when the leads are attached to the lead-out portion, because the lead wiring part and the lead-out part are separated from each other, the leads cannot be temporarily fixed to the lead wiring part; therefore, the attachability of the lead-out portion may deteriorate.

Further, in the case of the stator for the brushless electric motor disclosed in Patent Literature 2 mentioned above, because the lead-out bush functioning as a lead-out portion is directly mounted on the board, water having entered through the lead-out bush reaches the board. The water is pooled between the wiring part and the board, and it develops pattern corrosion on the board. Consequently, the position of the rotor can be difficult to detect, and the electric motor may become inoperable.

SUMMARY

The present invention has been made in view of the above, and an object of the present invention is to provide a stator for an electric motor that can improve ease of manufacturing and water infiltration resistance.

In order to solve the above problems and achieve the object, a stator for an electric motor according to an aspect of the present invention includes: an annular lead wiring part attached to one axial end of the stator and routing a power lead to a winding of the stator; and a lead-out part provided on a radially outer side of the annular lead wiring part and leading out the power lead to a radial outside of the lead wiring part. The lead wiring part is formed such that a curvature of an inner diameter is different near the lead-out part compared with a remaining portion, and a radius of an inner diameter of the lead wiring part is largest at a portion other than near the lead-out part.

Advantageous Effects of Invention

The stator for an electric motor according to the present invention provides an effect where ease of manufacturing and the water infiltration resistance in the finished product can be improved.

DETAILED DESCRIPTION

A stator for an electric motor, an electric motor, and an air conditioner according to an embodiment of the present invention will be explained below in detail with reference to the drawings. This invention is not limited to the embodiment.

Embodiment

Figure 1:
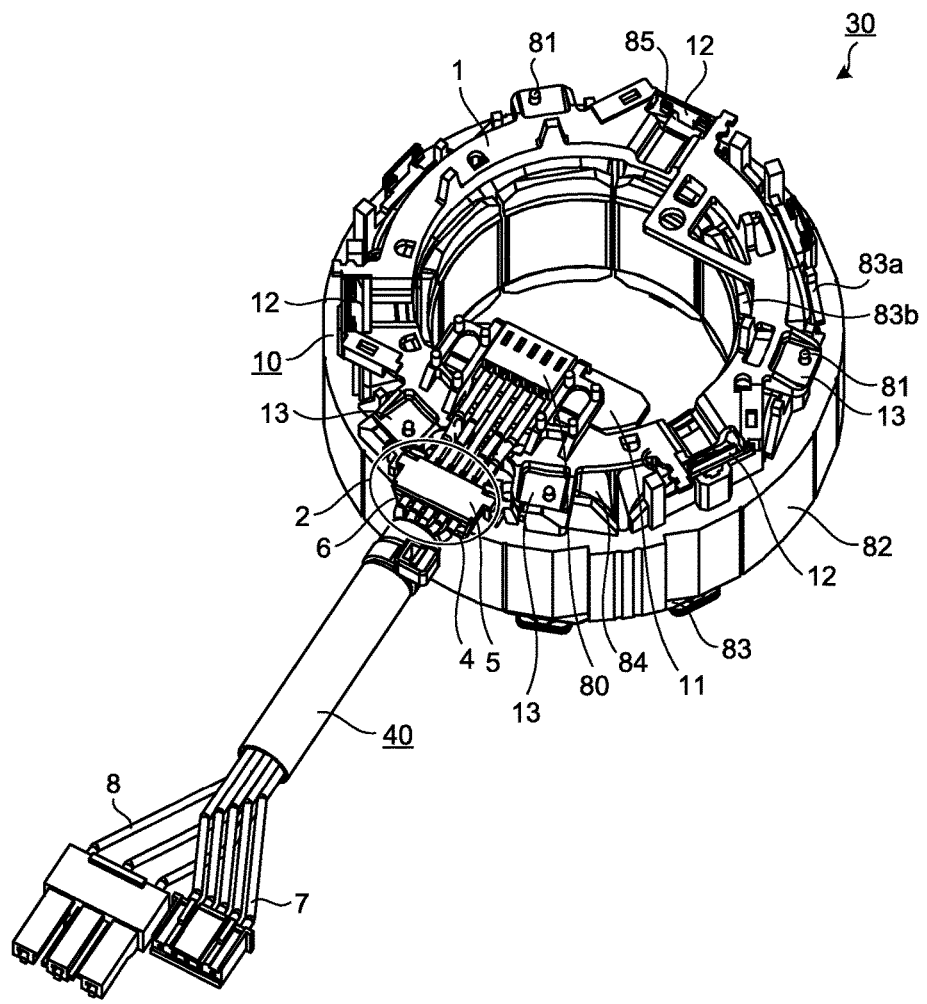
FIG. 1 is a perspective view of a stator assembly of an electric motor according to an embodiment of the present invention when viewed from the substrate side.
Figure 2:
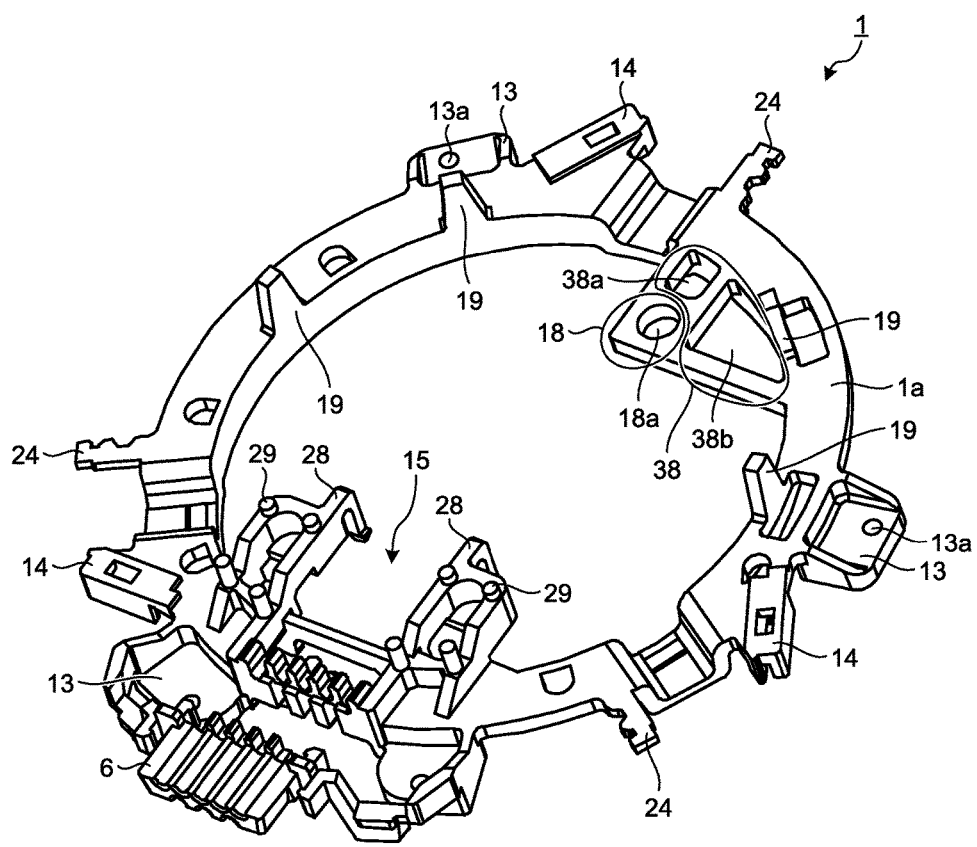
FIG. 2 is a perspective view of a lead wiring part.
Figure 3:
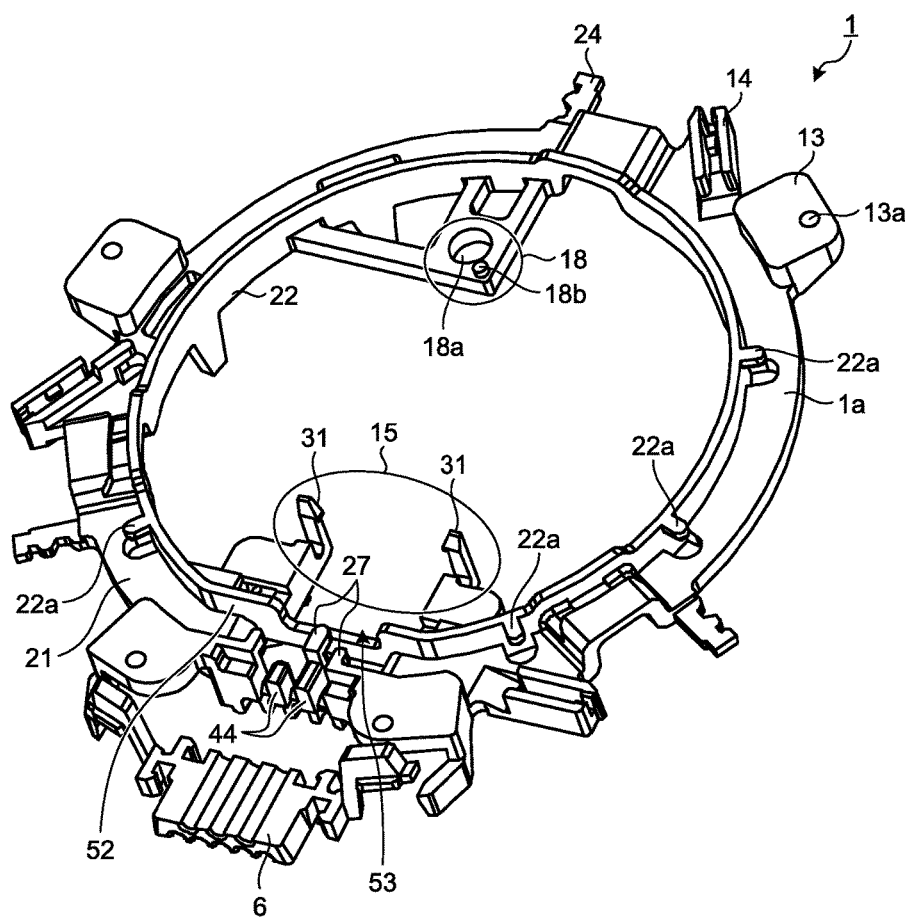
FIG. 3 is a perspective view of the lead wiring part illustrated in FIG. 2 when viewed from the opposite side.
Figure 4:
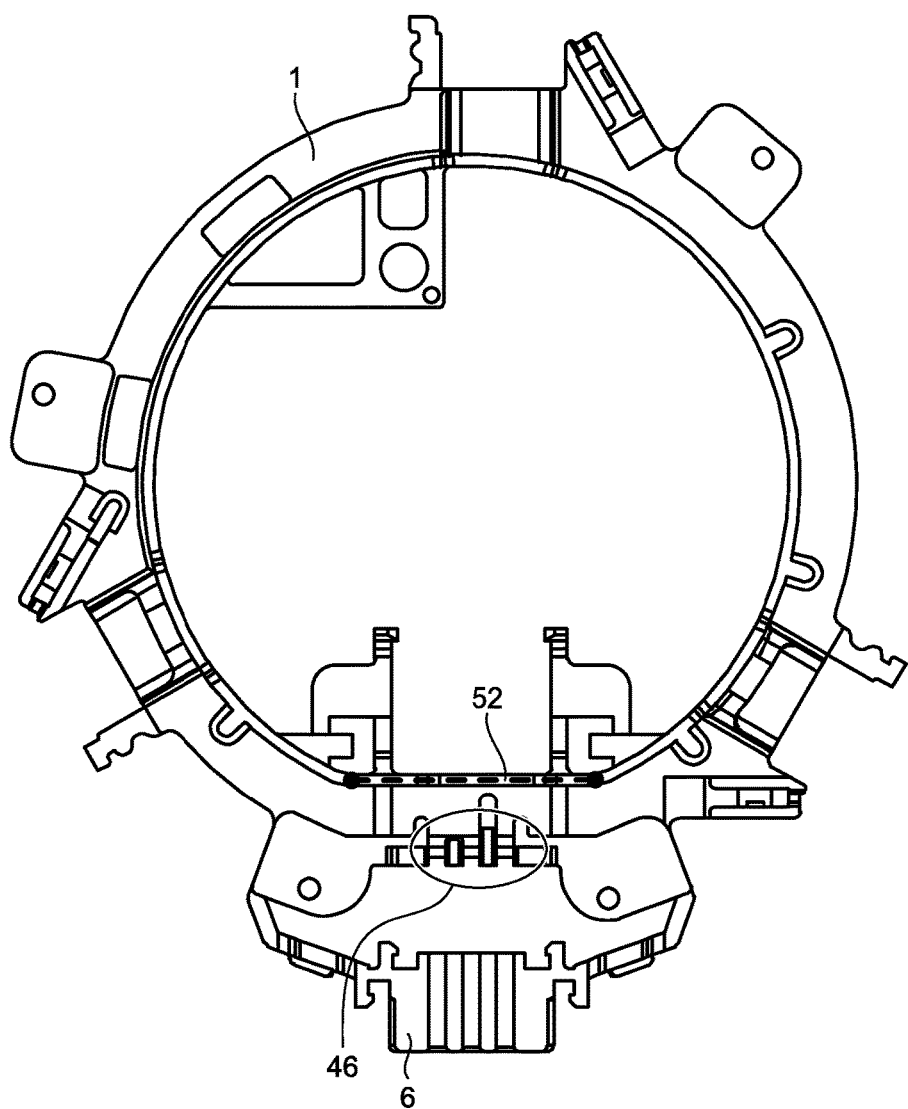
FIG. 4 is a view of the lead wiring part when viewed from the stator side.
Figure 5:
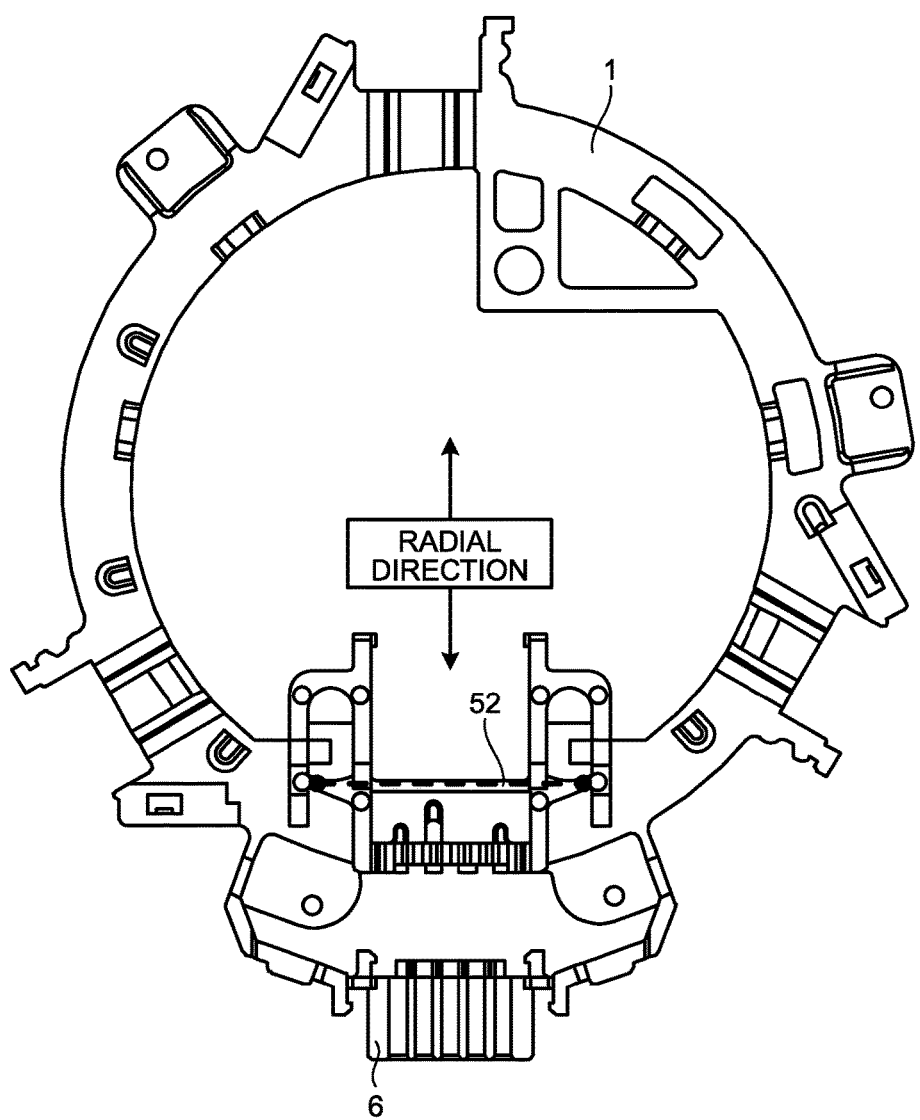
FIG. 5 is a view of the lead wiring part when viewed from the counter-stator side.
Figure 6:
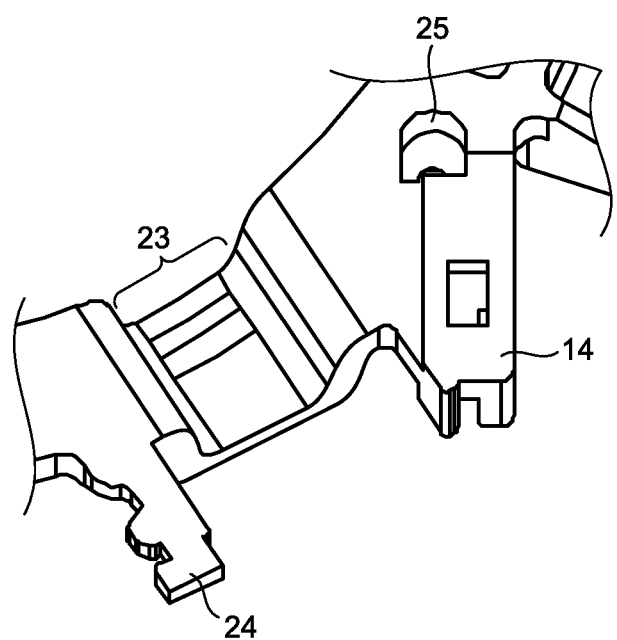
FIG. 6 is an enlarged view of a lead-end retaining portion.
Figure 7:
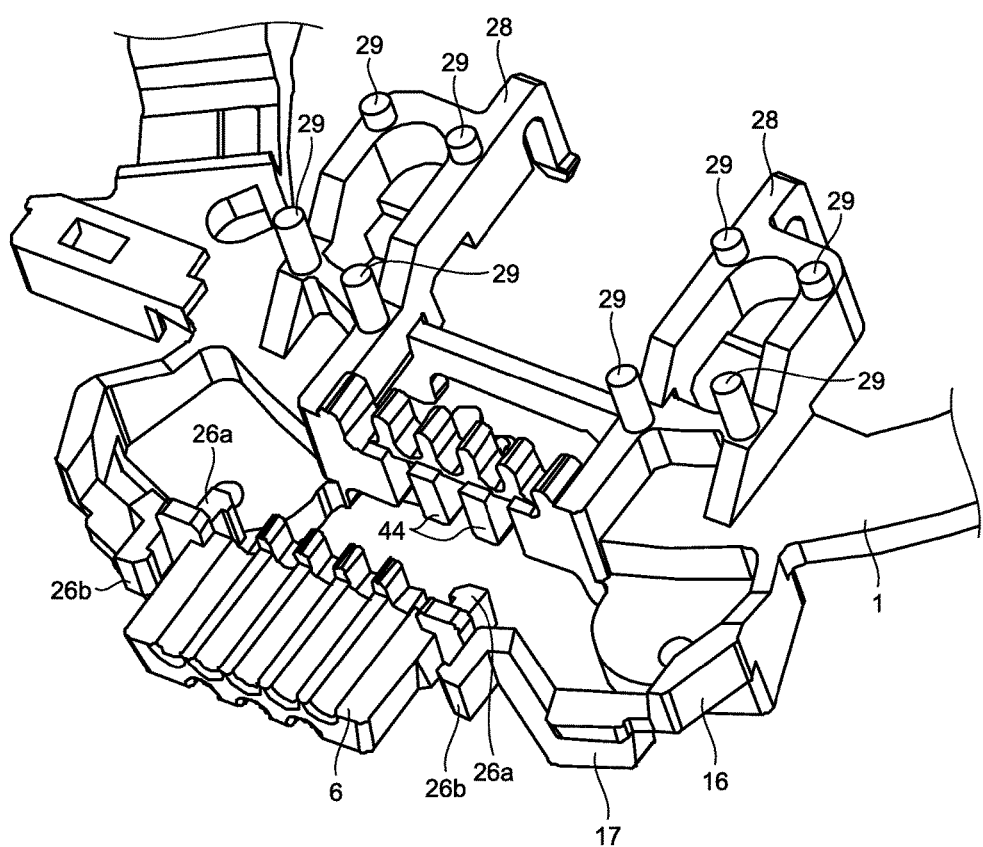
FIG. 7 is an enlarged view of a lead-out part and its surroundings.
Figure 8:
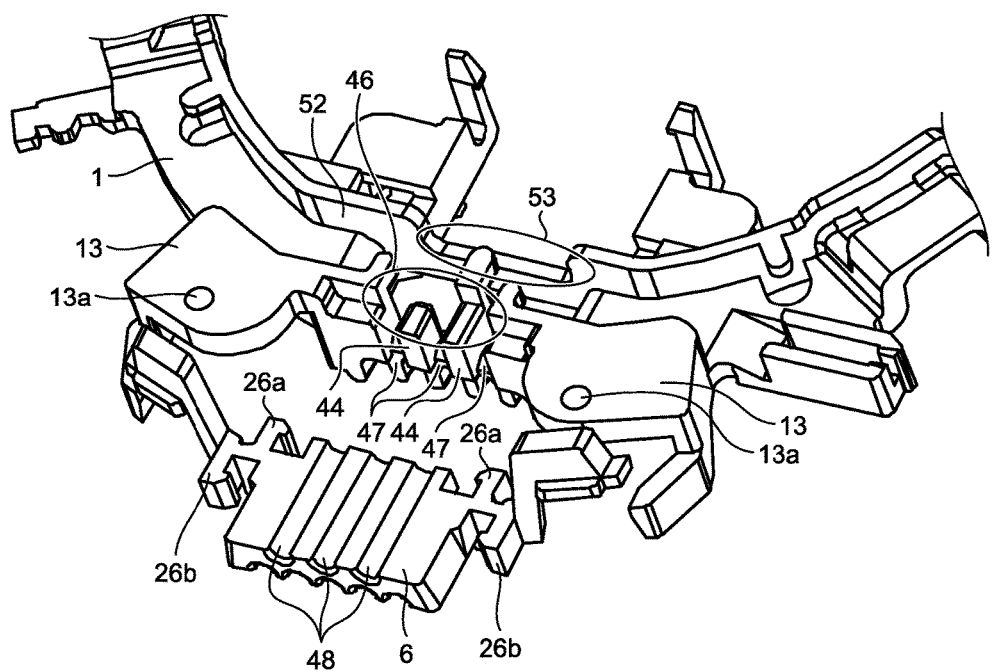
FIG. 8 is an enlarged view of the lead-out part and its surroundings illustrated in FIG. 7 when viewed from the opposite side.
Figure 9:
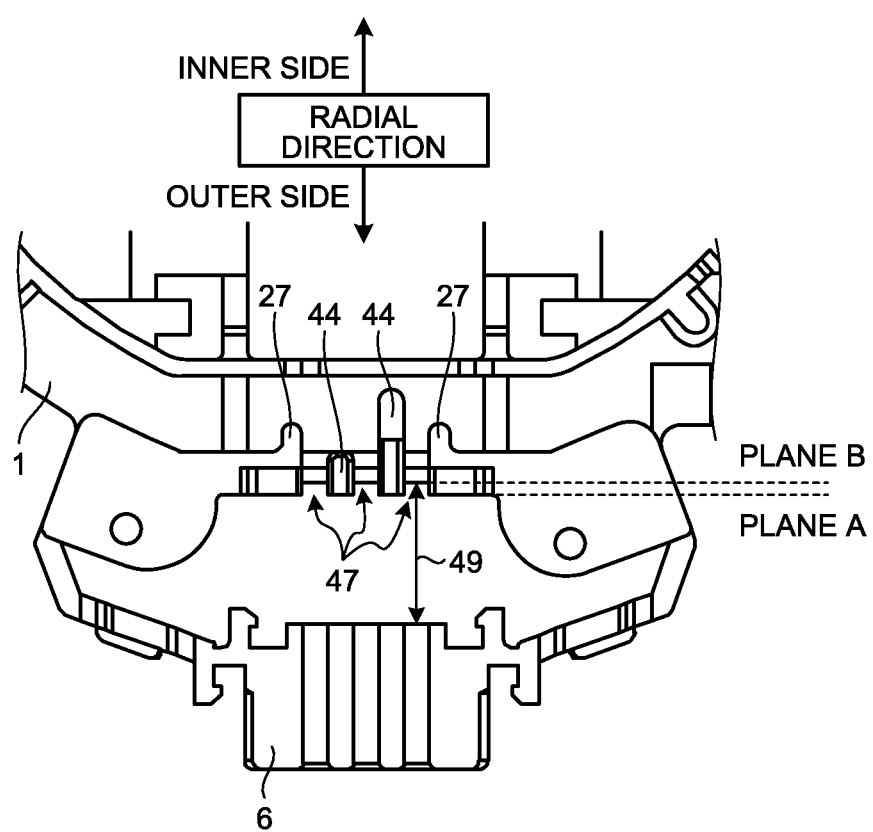
FIG. 9 is an enlarged view of the lead-out part and its surroundings.
Figure 10:
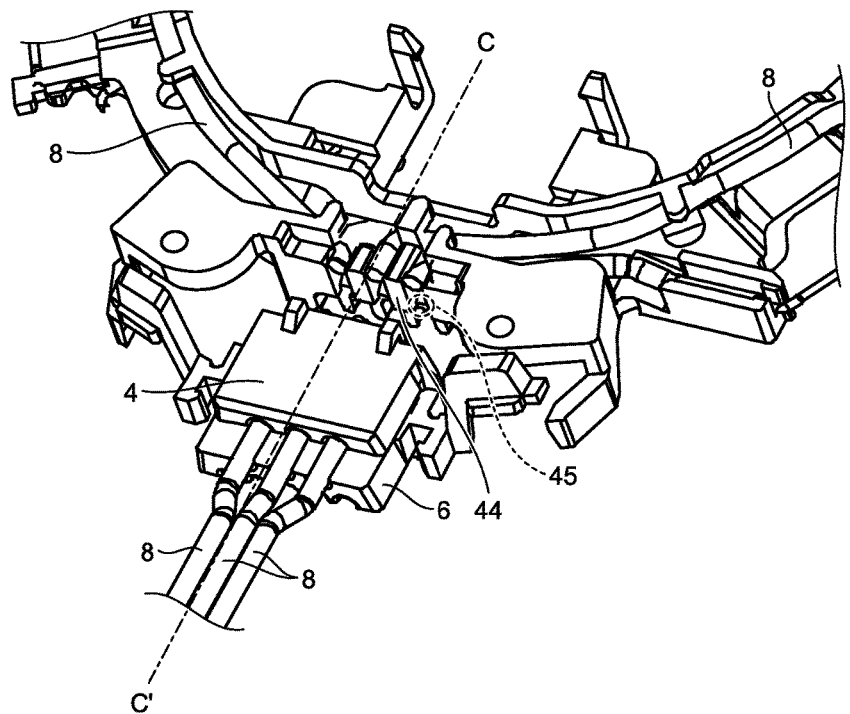
FIG. 10 is a perspective view of the lead-out part and its surroundings in a state where power leads are attached thereto.
Figure 11:
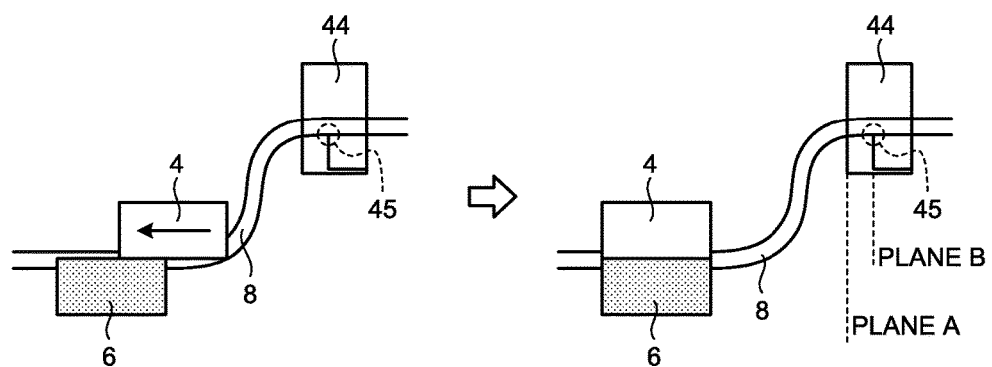
FIG. 11 is a view illustrating the positional relationship between a lead retaining projection, a bending fulcrum, and the lead-out part.
Figure 12:
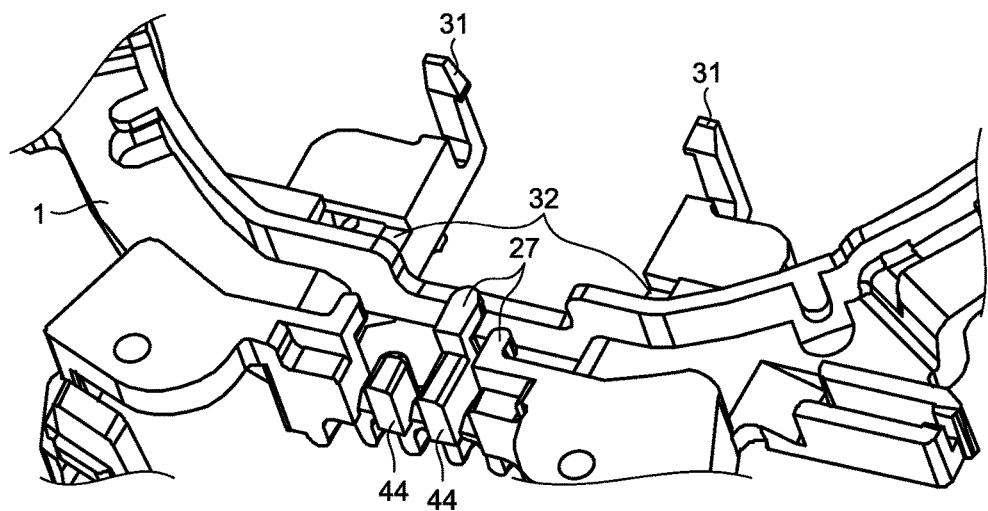
FIG. 12 is an enlarged view of a substrate retaining portion.
Figure 13:
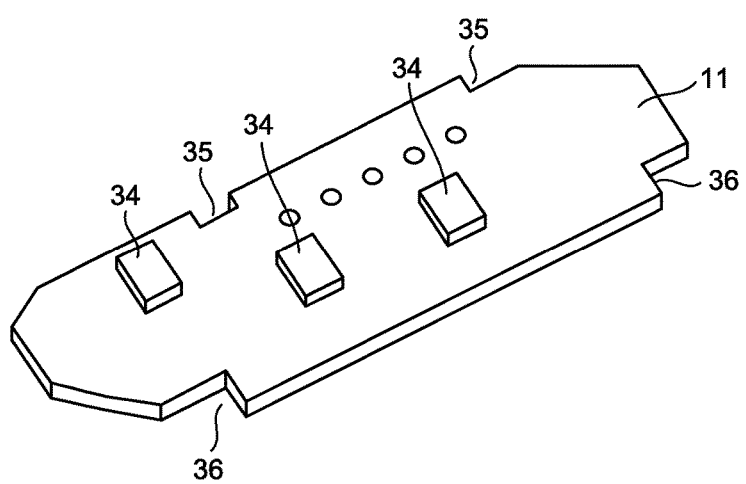
FIG. 13 is a perspective view of a substrate on which a position detection circuit for a rotor is mounted.
Figure 14:
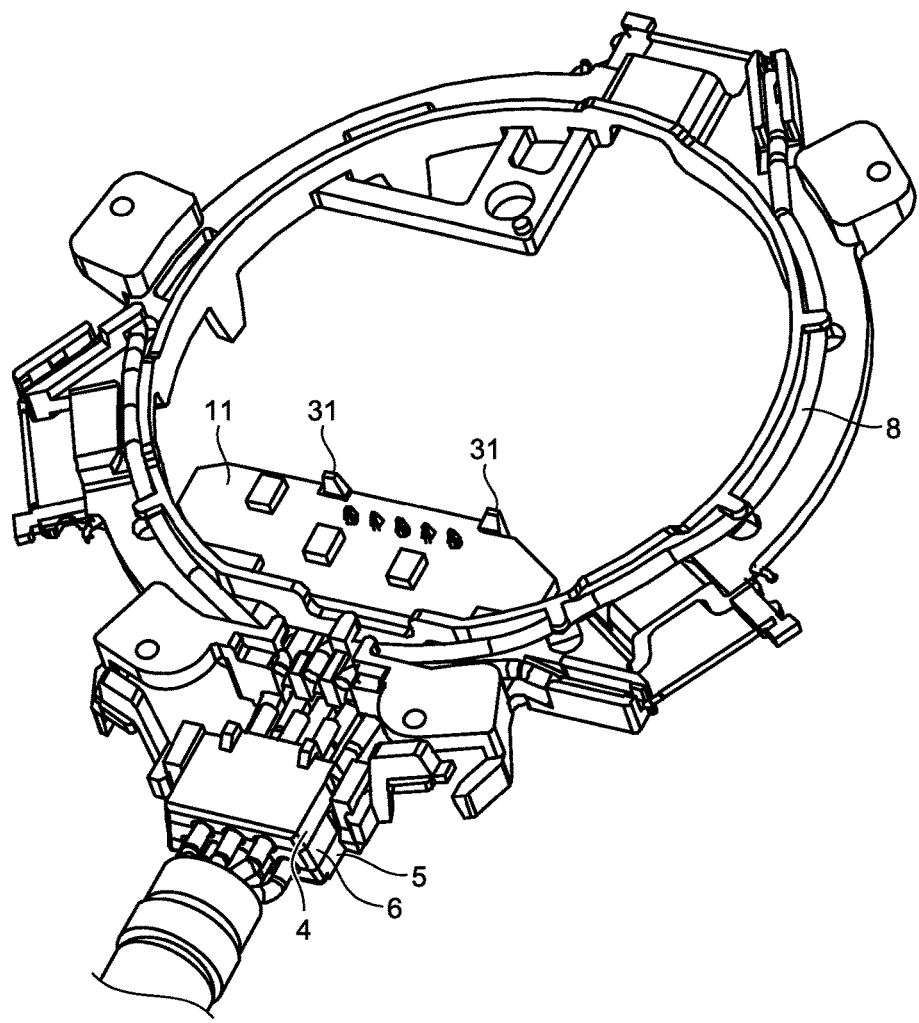
FIG. 14 is a perspective view of the lead wiring part in a state where power leads are routed.
Figure 15:
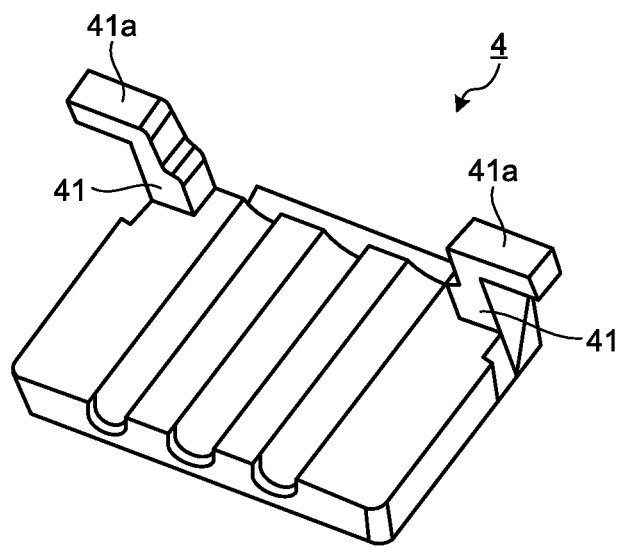
FIG. 15 is a perspective view of a power lead retaining part.
Figure 16:
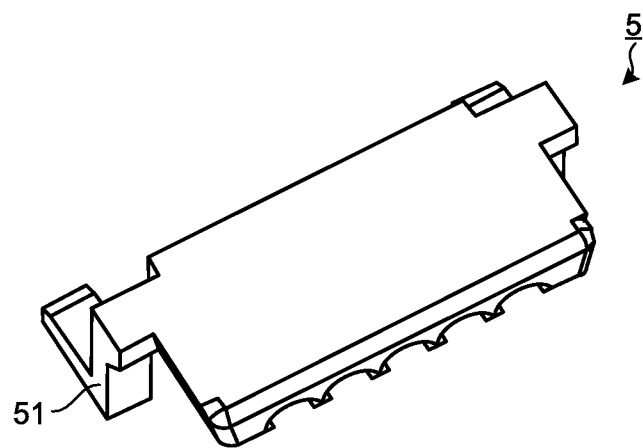
FIG. 16 is a perspective view of a sensor lead retaining part.
Figure 17:
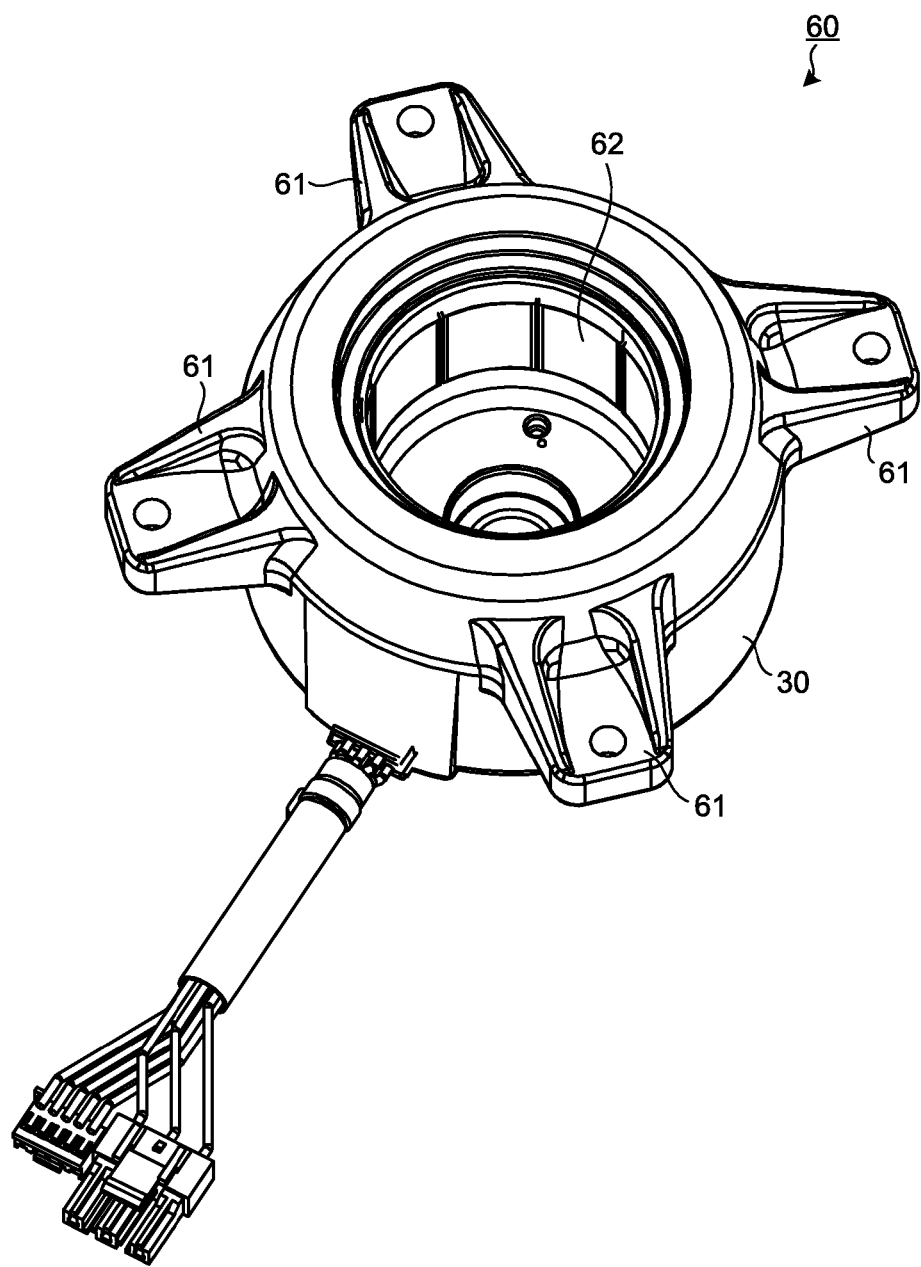
FIG. 17 is a perspective view of a molded stator.
Figure 18:
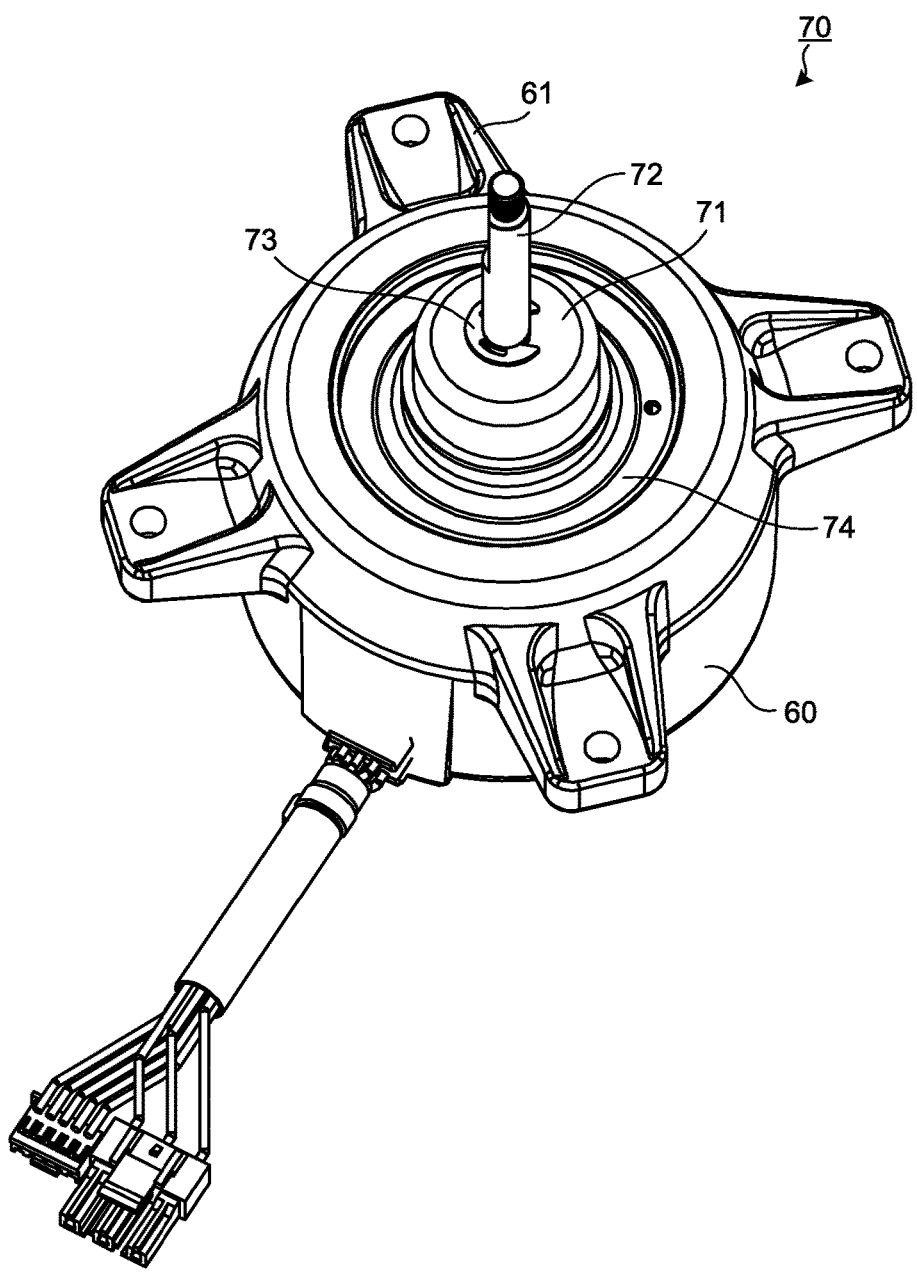
FIG. 18 is a perspective view of a molded electric motor.
Figure 19:
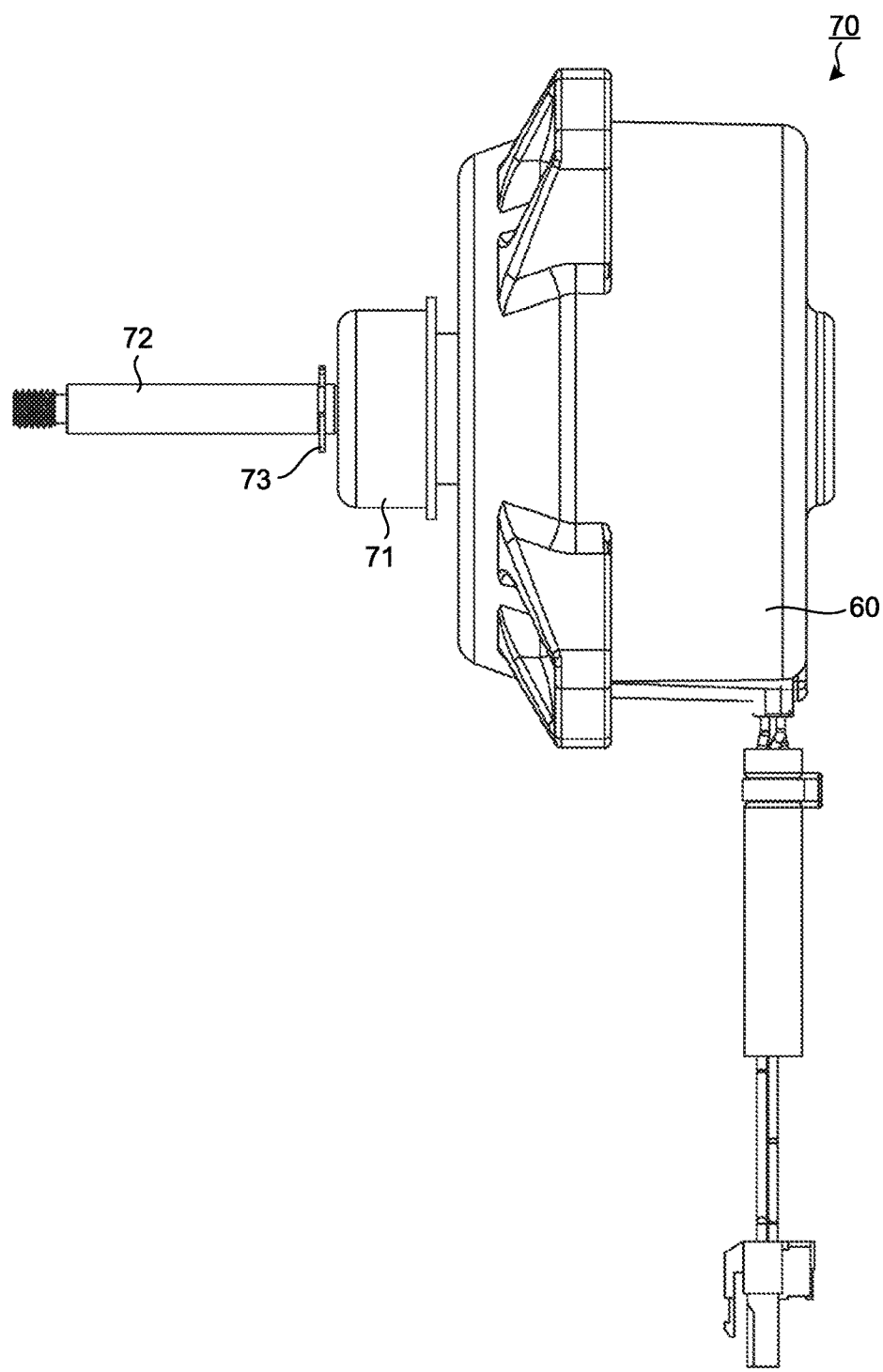
FIG. 19 is a side view of the molded electric motor.
Figure 20:
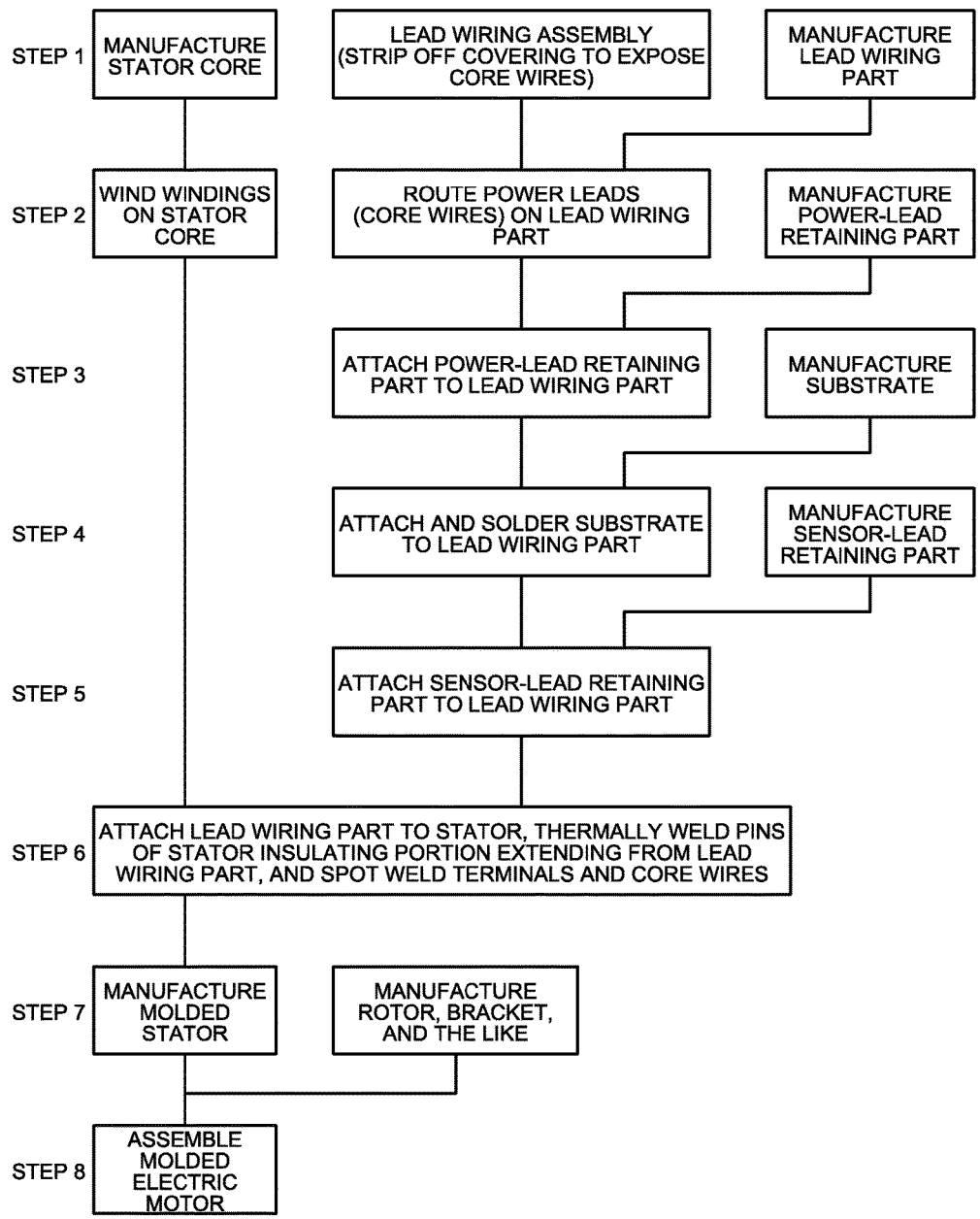
FIG. 20 is a diagram illustrating the manufacturing process of the molded electric motor.
Figure 21:
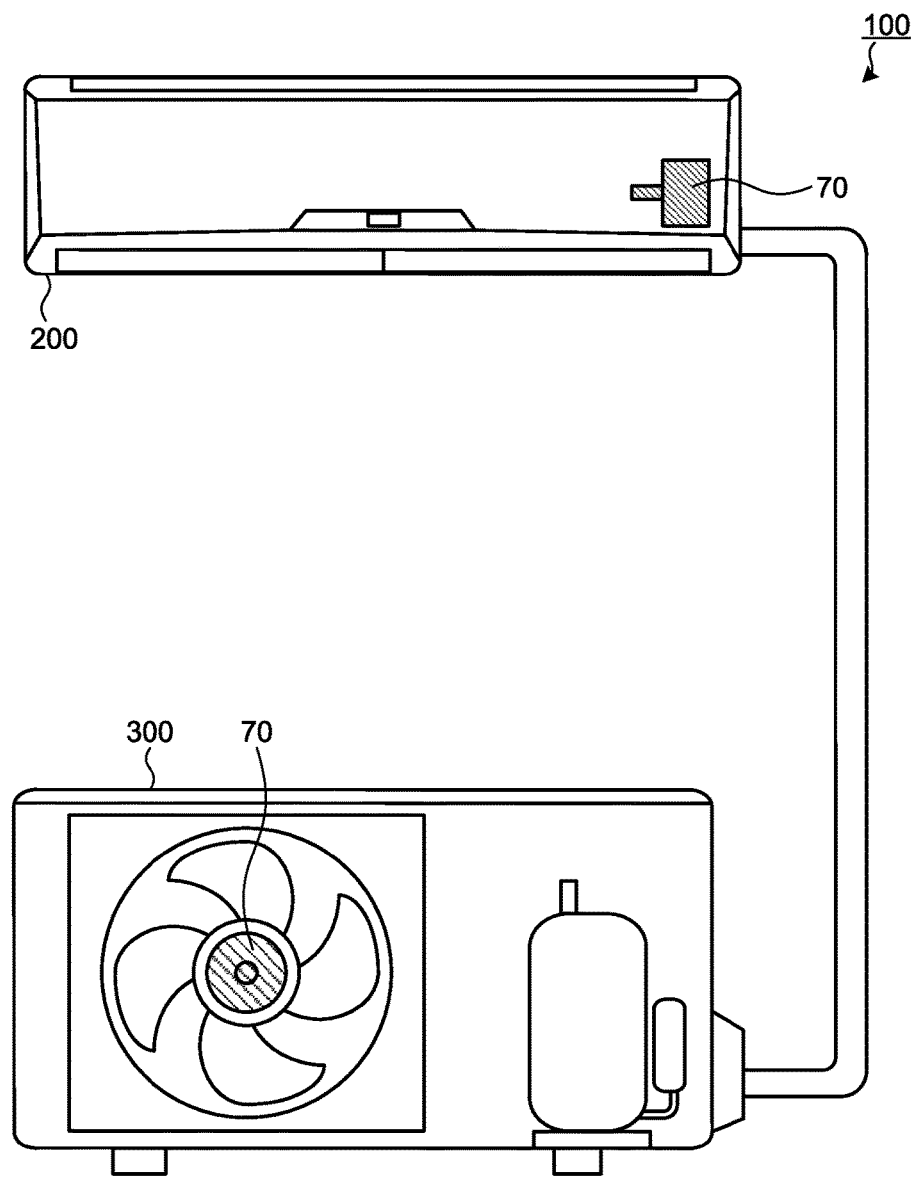
FIG. 21 is a diagram of a configuration of an air conditioner with the molded electric motor incorporated therein.

FIG. 1 is a perspective view of a stator assembly of an electric motor according to an embodiment of the present invention when viewed from the substrate side. FIG. 2 is a perspective view of a lead wiring part. FIG. 3 is a perspective view of the lead wiring part illustrated in FIG. 2 when viewed from the opposite side. FIG. 4 is a view of the lead wiring part when viewed from the stator side. FIG. 5 is a view of the lead wiring part when viewed from the counter-stator side. FIG. 6 is an enlarged view of a lead-end retaining portion. FIG. 7 is an enlarged view of a lead-out part and its surroundings. FIG. 8 is an enlarged view of the lead-out part and its surroundings illustrated in FIG. 7 when viewed from the opposite side. FIG. 9 is an enlarged view of the lead-out part and its surroundings. FIG. 10 is a perspective view of the lead-out part and its surroundings in a state where power leads are attached thereto. FIG. 11 is a view illustrating the positional relationship between a lead retaining projection, a bending fulcrum, and the lead-out part. FIG. 12 is an enlarged view of a substrate retaining portion. FIG. 13 is a perspective view of a substrate on which a position detection circuit for a rotor is mounted. FIG. 14 is a perspective view of the lead wiring part in a state where power leads are routed. FIG. 15 is a perspective view of a power lead retaining part. FIG. 16 is a perspective view of a sensor lead retaining part. FIG. 17 is a perspective view of a molded stator. FIG. 18 is a perspective view of a molded electric motor. FIG. 19 is a side view of the molded electric motor. FIG. 20 is a diagram illustrating the manufacturing process of the molded electric motor. FIG. 21 is a diagram of a configuration of an air conditioner with the molded electric motor incorporated therein.

A stator assembly 30 illustrated in FIG. 1 includes an annular stator 10; a lead wiring part 1, which is attached to the stator 10 at one axial end of the stator 10; a substrate 11 attached to the lead wiring part 1; and a lead wiring assembly 40.

The stator 10 includes a stator core 82, which is formed by stacking, which is realized by swaging, welding, bonding, or the like, magnetic steel sheets that are stamped into strips in the axial direction of a shaft 72 (see FIG. 18) of the rotor (not illustrated); an insulating portion 83; and windings 84, which are coils or magnetic wires wound around the insulating portion 83.

The insulating portion 83 is formed by molding a thermoplastic resin, such as PBT (Polybutylene Terephthalate), such that it is integral with the stator core 82 or is formed by attaching the molded thermoplastic resin to the stator 10. The insulating portion 83 includes a plurality of pins 81 projecting toward the lead wiring part 1 and a plurality of terminals 12 to which power is supplied from an external source.

The magnet wires are routed at one end to hook portions 85 of the terminals 12 and are bonded to the hook portions 85 by fusing, soldering, or the like. The magnet wires of all the phases are collected together at the other end to form a neutral point.

In the following description, the outer side of the end surface of the stator core 82 in the axial direction, i.e., the side on which the terminals 12 are provided, is referred to as a connection side and the side opposite to the connection side is referred to as a counter-connection side.

An insulating outer wall 83a constituting the insulating portion 83 prevents the windings 84 from falling toward the outer circumference side of the stator core 82, and the pins 81 for attaching the lead wiring part 1 to the stator 10 are provided at the axial end portion of the insulating outer wall 83a on the connection side.

An insulating inner wall 83b constituting the insulating portion 83 prevents the windings 84 from falling toward the inner circumference side of the stator core 82. Projections (not illustrated) are provided at the axial end portion of the insulating inner wall 83b on the counter-connection side. When a resin is molded onto the stator assembly 30, the projections abut against a mold core metal portion in the axial direction.

The axial end portion of the insulating outer wall 83a is formed such that it has a slightly greater height than the maximum axial height of the windings 84. Moreover, the windings 84 are formed such that their axial height is reduced toward the insulating inner wall 83b from the insulating outer wall 83a. With this configuration, when the height of the projections (not illustrated) on the counter-connection side of the insulating inner wall 83b is set the same as the height of the axial end portion of the insulating outer wall 83a, a sufficient distance from the projections to the windings 84 can be provided. Thus, when the stator 10 is placed on the mold core metal portion with the counter-connection side of the stator 10 facing downward, the stator 10 can be placed stably without the windings 84 coming into contact with the mold core metal portion. This enables an improvement in productivity and quality.

The lead wiring assembly 40 includes power leads 8 for supplying power to the windings 84; sensor leads 7; and a housing 80 connected to the ends of the sensor leads 7. The housing 80 is connected to the ends of the sensor leads 7 that are located inside the mold when a resin is molded onto the stator assembly 30.

Electronic parts, such as Hall ICs 34 functioning as a position detection circuit for the rotor, are mounted on the substrate 11 (see FIG. 13). The housing 80 includes contacts for electrically connecting the position detection circuit formed on the substrate 11 to the sensor leads 7. In a state where the substrate 11 is attached to a substrate retaining portion 15, which will be described later, and the housing 80 is disposed on the surface on the counter-stator side of the substrate 11, the contacts are exposed on the surface on the stator side of the substrate 11. The sensor leads 7 are electrically connected to the position detection circuit by bonding the contacts exposed on the surface on the stator side of the substrate 11 with solder.

The lead wiring part 1 is used for the wiring of the sensor leads 7 and the power leads 8. Further, the positional relationship of the sensor leads 7 and the power leads 8 with the lead wiring part 1 is maintained by a lead lead-out portion 2 (see FIG. 1), which includes a power lead retaining part 4 (see FIG. 15), a sensor lead retaining part 5 (see FIG. 16), and a lead-out part 6 (see FIG. 7 and FIG. 8). The lead lead-out portion 2, i.e., the structure including the power lead retaining part 4, the sensor lead retaining part 5, and the lead-out part 6, is provided to route the sensor leads 7 and the power leads 8, which are laid on by the lead wiring part 1, toward the outside of the lead wiring part 1. The lead lead-out portion 2 also serves to prevent the sensor leads 7 and the power leads 8 from being displaced from the routing position when a resin is molded onto the stator assembly 30.

Next, the lead wiring part 1 will be explained. The lead wiring part 1 is molded with a thermoplastic resin, such as PBT, such that it is formed into an approximately ring shape (see FIG. 2). As illustrated in FIG. 2, a plurality of attaching legs 13 for attaching the lead wiring part 1 to the stator 10 are provided at the outer circumference of the lead wiring part 1. Each of the attaching legs 13 has a hole 13a for inserting the pin 81 that is used for attaching the lead wiring part 1 and is included in the insulating portion 83 of the stator 10. When the lead wiring part 1 is attached to the stator 10, the attaching legs 13 come into contact with the installation surface of the wiring part of the insulating portion 83 of the stator 10, and thus the lead wiring part 1 is positioned in the axial direction. At this point in time, because the pins 81 of the insulating portion 83 are inserted into the holes 13a of the attaching legs 13, the lead wiring part 1 is positioned in the rotational direction. After the lead wiring part 1 is positioned, i.e., after the pins 81 of the insulating portion 83 are inserted into the holes 13a of the attaching legs 13, the pins 81 are, for example, ultrasonically welded so as to secure the lead wiring part 1 to the stator 10.

Next, the wiring of the power leads 8 will be explained. The power leads 8 are routed via the lead lead-out portion 2 to the terminals 12 of the stator 10 along the lead wiring part 1. Specifically, the three-phase power leads constituting the power leads 8 are respectively routed to the terminals 12 of the stator 10, which are arranged at intervals of approximately 120°. The ends of the three-phase power leads are stripped of their covering and are brought into contact with the walls of lead-end retaining portions 14 so as to be positioned. When the lead wiring part 1 is attached to the stator 10, the three-phase power leads are routed along a lead wiring surface 21, which is the surface of the lead wiring part 1 on the stator 10 side, and a wall 22 provided on the inner circumference (see FIG. 3). A plurality of projections 22a are provided on the wall 22 to prevent displacement of the power leads 8. The power leads 8 are routed while being bent toward the lead-out part 6 by lead fold-back pins 27 provided near the lead-out part 6 and are retained such that they are fitted into lead retaining projections 44 provided near the lead-out part 6. The lead fold-back pins 27 are projections that function to prevent displacement of the leads.

In this embodiment, as illustrated in FIG. 4 and FIG. 5, the lead wiring part 1 is formed such that a portion near the lead-out part 6 has a shape projecting toward the central side. Specifically, the wall 22 provided on the inner circumference of the lead wiring part 1 includes a flat portion 52 near the lead-out part 6 (see FIG. 3). This flat portion 52 is substantially perpendicular to the direction of the radius of the stator, i.e., a direction toward the central axis of the stator 10. More specifically, the curvature of the inner circumference of the lead wiring part 1 is formed such that it is larger near the lead-out part 6 than at the other portions (which corresponds to "different near the lead-out part compared with a remaining portion" in claim 1). In the following description, "direction of the radius" may be referred to as "radial direction". The flat portion 52 of the wall 22 is provided at a position substantially parallel with the end portion of the lead-out part 6 in the radial direction. Consequently, the radius of the inner diameter of the lead wiring part 1 becomes maximum at the portions other than near the lead-out part 6. Because the projecting shape is formed at a position near the lead-out part 6 of the lead wiring part 1 in this way, a lead-routing retaining position 46, at which the sensor leads 7 and the power leads 8 routed by the lead wiring part 1 are gathered, can be arranged on the inner diameter side of the lead wiring part 1 in the radial direction. As a result, the distance between the lead wiring part 1 and the lead-out part 6 is ensured, whereby the lead wiring part 1 and the lead-out part 6 are prevented from coming into contact with each other, and thus the water infiltration resistance is improved. Further, this enables an improvement in the ease with which the power lead retaining part 4, which needs to be attached to the lead-out part 6 from the central side of the lead wiring part 1, is attached.

Further, as illustrated in FIG. 8, the flat portion 52 of the wall 22 provided on the inner circumference of the lead wiring part 1 includes a recess 53 in the axial direction of the lead wiring part 1. Because the recess 53 is provided, when one of the power leads 8 is routed to the lead-end retaining portion 14 that is farthest from the lead-out part 6, this power lead 8 can be first routed on the inner diameter side of the lead wiring part 1 in the radial direction, i.e., on the central side of the stator 10, and then bent and routed toward that lead-end retaining portion 14. This enables an improvement in the ease of routing the power leads 8.

Further, as illustrated in FIG. 3, FIG. 7, and FIG. 8, the lead wiring part 1 includes the lead retaining projections 44, which are provided at a position opposed to the lead-out part 6 and retain the leads and align the direction of the leads. With this arrangement, the power leads 8 can be retained by the lead retaining projections 44 of the lead wiring part 1 during the process of attaching the power lead retaining part 4 after the power leads 8 are laid on the lead-out part 6. In this case, there is no need to retain the power leads 8 by the lead-out part 6 when the power lead retaining part 4 is attached. Consequently, the lead-out part 6 does not need to be provided with projections for retaining the power leads 8, whereby the lead-out part 6 can be reduced in size, and the distance between the lead wiring part 1 and the lead-out part 6 can be ensured. This enables an improvement in the attachability of the lead-out part 6 and the power lead retaining part 4. Further, the lead wiring part 1 and the lead-out part 6 are prevented from coming into contact with each other, and thereby the water infiltration resistance can be improved. Further, because the power leads 8 routed on the lead wiring part 1 are retained by the lead retaining projections 44, the routed power leads 8 extend straight toward the lead-out part 6. Accordingly, when the power lead retaining part 4 is attached to the lead-out part 6, it is possible to reduce the difficulty with this attachment caused by curling of the power leads 8, which impedes their insertion into the lead insertion grooves of the lead-out part 6. This enables an improvement in the ease of attaching the power lead retaining part 4 to the lead-out part 6. Further, in a state where the lead-out part 6 is connected to the lead wiring part 1, the power lead retaining part 4 and the sensor lead retaining part 5 are attached to the lead-out part 6 to make up the stator assembly 30, and then a resin is molded onto the stator assembly 30. Before a resin is molded onto the stator assembly 30, the lead wiring part 1 and the lead-out part 6 are separated from each other by cutting the connection portion therebetween at a predetermined position. Consequently, the lead wiring part 1 and the lead-out part 6 become individual components, and the interface between the lead wiring part 1 and the mold material (water infiltrating passage) can be cut off. This enables prevention of water from infiltrating into the substrate 11 and the stator 10.

Next, the lead retaining projections 44 and their surrounding portions will be explained with reference to FIG. 9. As illustrated in FIG. 9, the lead wiring part 1 is provided with the lead retaining projections 44. Further, the lead wiring part 1 includes a plurality of lead insertion portions 47 into which the three power leads 8 are respectively inserted when the power leads 8 are retained by the lead retaining projections 44. The length of the lead insertion portions 47 in the radial direction, i.e., the illustrated length in the radial direction, is smaller than the length of the lead retaining projections 44 in the radial direction. As described above, in the lead wiring part 1, the length of the lead insertion portions 47 in the radial direction (the length from the inner circumference of the lead wiring part 1 to a plane B indicated in FIG. 9) is smaller than the length of the lead retaining projections 44 in the radial direction (the length from the inner circumference of the lead wiring part 1 to a plane A indicated in FIG. 9). Accordingly, as compared with a case where these lengths are equal to each other, it is possible, while sufficiently ensuring the area for retaining the power leads 8 by the lead retaining projections 44, to shift a bending fulcrum 45 (see FIG. 11) inward in the radial direction with respect to the lead wiring part 1, with the bending fulcrum 45 functioning as a point for bending the power leads 8 when the power leads 8 are attached to the lead-out part 6. FIG. 11 is a view illustrating the positional relationship between the lead retaining projections 44, the bending fulcrum 45, and the lead-out part 6 when the lead wiring part 1 and the lead-out part 6 are cut along the line C-C' indicated in FIG. 10. In this respect, FIG. 10 omits illustration of part of the power leads 8 near the lead retaining projections 44 so as to clarify the relationship between the lead retaining projections 44 and the bending fulcrum 45. FIG. 11 illustrates the positional relationship of the lead retaining projections 44 provided on the lead wiring part 1 with the bending fulcrum 45 and the lead-out part 6, and it further illustrates the operation sequence for attaching the power lead retaining part 4 to the lead-out part 6. As illustrated in FIG. 11, in the operation of attaching the power lead retaining part 4, the power lead retaining part 4 is slid from the lead retaining projections 44 side toward the lead-out part 6 side, i.e., from the central side of the lead wiring part 1 toward the outside, and it is thereby attached to the lead-out part 6. Accordingly, because the bending fulcrum 45 is shifted inward in the radial direction with respect to the lead wiring part 1, the distance from the bending fulcrum 45 to the lead-out part 6, i.e., a distance 49 from the plane B indicated in FIG. 11 to the lead-out part 6, can be set larger. If the distance from the bending fulcrum 45 to the lead-out part 6 is set larger, the amount of interference between the power leads 8 and the power lead retaining part 4 becomes smaller when the power lead retaining part 4 is attached to the lead-out part 6. Consequently, the operation of attaching the power lead retaining part 4 to the lead-out part 6 becomes easier and ease of assembly is improved.

The explanation refers back to the wiring of the power leads 8. The three power leads 8 are respectively routed to the different lead-end retaining portions 14 via a power lead retaining section that is formed by the lead-out part 6 and the power lead retaining part 4 disposed thereunder. The power lead 8 to be connected to a first lead-end retaining portion, which is the lead-end retaining portion 14 that is farthest from the lead-out part 6, is routed to a middle groove 48 provided on the lead-out part 6 (see FIG. 3 and FIG. 8) and is retained by the lead retaining projections 44, and it is further bent and routed by the lead fold-back pins 27 toward the first lead-end retaining portion. The power leads 8 to be connected to second lead-end retaining portions, which are the two of the lead-end retaining portions 14 on both sides of the lead-out part 6, are respectively routed to outer grooves 48 provided on the lead-out part 6 (see FIG. 3 and FIG. 8) and are retained by the lead retaining projections 44, and they are further bent and routed by the lead fold-back pins 27 toward the second lead-end retaining portions. Here, one of the two power leads 8 connected to the second lead-end retaining portions is routed around the outside of the power lead 8 that is routed to the first lead-end retaining portion (see FIG. 14). FIG. 14 is a view illustrating the stator side of the lead wiring part 1 in a state where the power leads 8 are routed.

The core wires of the power leads 8 stripped of their covering are retained by core-wire retaining portions 24 separated by a given distance respectively from the lead-end retaining portions 14 such that the core wires are in proximity to the terminals 12 of the stator 10 in a state where the lead wiring part 1 is attached to the stator 10 (see FIG. 6).

Further, in order to provide spaces for electrodes that sandwich the terminals 12 and the core wires, the lead wiring part 1 is provided with recesses 23 for the electrodes to escape therethrough (see FIG. 6). The spaces for the electrodes that sandwich the terminals 12 and the core wires are necessary for the operation of spot-welding the core wires and the terminals 12 after the lead wiring part 1 is attached to the stator 10. With the provision of the recesses 23, the power leads 8 are routed closer to the stator 10 from the lead wiring surface 21 (see FIG. 3) of the lead wiring part 1. Displacement prevention projections 25 are provided near the recesses 23 for the electrodes to escape therethrough. The power leads 8 are axially positioned by the displacement prevention projections 25.

Further, as illustrated in FIG. 2, the lead wiring part 1 includes a plurality of substantially trapezoidal pedestals 19 on the surface on the counter-stator side. The end surfaces on the counter-stator side of the pedestals 19 come into contact with a mold during molding; therefore, the stator assembly 30 can be axially positioned. The pedestals 19 have a substantially trapezoidal shape; therefore, it is possible to reduce the area of the pedestals 19 exposed to the outside of the molded stator and to increase the buckling strength of the pedestals 19.

Further, the lead wiring part 1 includes a positioning portion 18 that is used for positioning during molding that is performed after the lead wiring part 1 is attached to the stator 10 (see FIG. 2 and FIG. 3). The positioning portion 18 is located on the inner side of the inner circumference of the stator 10 in the stator assembly 30 obtained by attaching the lead wiring part 1 to the stator 10, and it is provided at a predetermined position corresponding to a pin, a projection, or the like projecting from the center shaft that is used for positioning the mold in the radial direction. The positioning portion 18 has an insertion hole 18a. The pin, the projection, or the like projecting from the center shaft that is used for positioning the mold in the radial direction is inserted into the insertion hole 18a; therefore, the stator assembly 30 is positioned in the rotational direction. At this point in time, the lead-out part 6 secured to the mold and the sensor leads 7 and the power leads 8 of the stator assembly 30 are positioned along substantially the same straight line. The lead-out part 6 and the leads of the stator assembly 30 are positioned substantially on the same straight line. Thus, the stator 10 is prevented from being displaced in the rotational direction when it is set in a mold and thus the stator 10 is prevented from being angularly offset from the lead-out part 6. Moreover, the sensor leads 7 are prevented from being stretched and thus a load can be prevented from being applied to the soldered portion of the substrate 11. When the rotational force is applied to the stator 10 due to the resin pressure during molding, the positioning portion 18 also functions to prevent the stator 10 from rotating.

The positioning portion 18 may be provided in the annular body 1a of the lead wiring part 1 or may be provided such that it is connected to the body 1a as illustrated in FIG. 2 or FIG. 3. When the positioning portion 18 is provided such that it is connected to the body 1a, by forming the portion from the body 1a of the lead wiring part 1 to the positioning portion 18, i.e., a connection portion 38 connecting the positioning portion 18 to the body 1a, into a thin connection shape, the positioning portion 18 can be prevented from being deformed due to the molding pressure that is the resin pressure during molding of the molded stator and thus the positioning portion 18 can be prevented from being exposed to the mold inner-diameter portion side. This enables an improvement in the quality.

Here, the thin connection shape means a shape that makes the surface area of the connection portion 38 smaller when viewed in the axial direction of the stator 10, in a state where the lead wiring part 1 is attached to the stator 10. As illustrated in FIG. 2, in the lead wiring part 1, the connection portion 38 connecting the positioning portion 18 to the body 1a includes holes 38a and 38b, to narrow the area of the connection portion 38 in the axial direction, i.e., the area of the surface perpendicular to the axial direction of the stator 10, whereby the thin connection shape is achieved. Because the connection portion 38 connecting the positioning portion 18 to the body 1a of the lead wiring part 1 includes the holes 38a and 38b, when the molded stator is molded, the molding pressure in the axial direction applied to the connection portion 38 and the positioning portion 18 can be released. In the connection portion 38, the holes 38a and 38b constitute a molding pressure reducing part for reducing the pressure due to the mold resin during molding of the molded stator. In the example illustrated in FIG. 2, the connection portion 38 includes the holes 38a and 38b, but the number of holes is not limited to the illustrated example. The connection portion 38 may be configured to include one hole or three or more holes. The shape of each hole is also not limited to the illustrated example. The number of holes, the shape of each hole, and the position of each hole included in the connection portion 38 are determined, for example, depending on the axial direction thicknesses of the positioning portion 18 and the connection portion 38 such that the molding pressure applied to the positioning portion 18 and the connection portion 38 in the axial direction becomes a desired value during molding of the molded stator.

Further, the positioning portion 18 of the lead wiring part 1 includes, on the stator side, a projection 18b (see FIG. 3), which comes into contact with the axial end surface of a center shaft that is used for positioning the mold in the radial direction. With the provision of the projection 18b, the stator assembly 30 is axially positioned by bringing the projection 18b into contact with the axial end surface of the center shaft during molding. Therefore, with the provision of the projection 18b, the positioning portion 18 can be prevented from being deformed due to the resin pressure during molding and thus can be prevented from being exposed to the mold inner-diameter portion side. This enables an improvement in quality.

Further, the positioning portion 18 of the lead wiring part 1 is provided at a position opposed to the substrate retaining portion 15. When the molded electric motor that includes the stator assembly 30 according to the present embodiment is installed such that, for example, its axis is horizontal relative to the outdoor unit of the air conditioner, the molded electric motor is installed such that the lead-out part 6 is located in the lower portion in order to prevent water from entering the molded electric motor. In this case, because the positioning portion 18 is disposed in the upper portion of the outdoor unit, if water enters the molded electric motor, water can be prevented from entering from the surface that is in contact with the center shaft of the mold during molding. This enables an improvement in quality.

Further, the lead wiring part 1 includes the substrate retaining portion 15 on the inner circumference side of the stator 10 (see FIG. 3, FIG. 12, and so forth). The substrate retaining portion 15 includes claws 31 and grooves 32 for attaching the substrate 11. The substrate 11 (see FIG. 13) on which the position detection circuit for the rotor is mounted is attached to the substrate retaining portion 15. As illustrated in FIG. 13, the substrate 11 has an approximately rectangular shape obtained by chamfering diagonally opposite corners and includes grooves 35 on one long side and notches 36 on the other long side. The grooves 35 are used to lock the lead wiring part 1 and the notches 36 are formed by notching part of the substrate 11 such that the substrate 11 is positioned when it is attached to the lead wiring part 1.

Moreover, the substrate retaining portion 15 of the lead wiring part 1 includes the claws 31 that are locked to the grooves 35 of the substrate 11; and the grooves 32 into which the long side of the substrate 11 with a part thereof notched is fitted when the substrate 11 is attached. By mating the notches 36 of the substrate 11 and the grooves 32 of the substrate retaining portion 15, the lead wiring part 1 and the substrate 11 can be prevented from moving and deforming due to the molding pressure during molding. This enables an improvement in the quality of the molded electric motor. Moreover, the substrate 11 is attached to the lead wiring part 1 while inserting the long side of the substrate 11 with a part thereof notched into the grooves 32 of the substrate retaining portion 15 of the lead wiring part 1; therefore, the substrate 11 can be easily attached to the lead wiring part 1. With the above structure, the substrate 11 does not need to be provided with an unnecessarily large positioning portion. Consequently, the area of the substrate 11 can be reduced and thus the number of the substrates 11 that can be molded with a single mold increases. This enables a reduction in the cost of the electric motor.

During manufacturing, the substrate 11 is attached, and then the substrate 11 and the housing 80 for the sensor leads 7 are bonded to each other by soldering. The sensor leads 7 are routed toward the lead-out part 6 on the surface of the lead-out part 6 that is opposite to the surface on which the power leads are laid.

As illustrated in FIG. 2 and FIG. 7, the claws 31 with which the substrate 11 is attached are connected to the annular body 1a of the lead wiring part 1 by a plurality of thin connection portions 28. Thus, the molding pressure applied to the substrate 11 during the molding can be evenly distributed. As in the connection portion 38 described above, each of the thin connection portions 28 includes a hole to narrow its surface area in the axial direction, whereby a structure is achieved that reduces the molding pressure in the axial direction.

The thin connection portions 28 each include projections 29 formed to project toward the counter-stator side. The projections 29 come into contact with a mold during molding; therefore, the substrate 11 can be axially positioned and thus the axial displacement of the substrate 11 can be prevented (see FIG. 2 and FIG. 7).

As illustrated in FIG. 7, the lead-out part 6 includes projections 17 extending from the ends in the circumferential direction toward the lead wiring part 1 by a given length in the circumferential direction. Each of the projections 17 includes a flat portion on a radially outer side such that the flat portion is substantially perpendicular to the radial direction of the stator 10 in a state where the lead wiring part 1 is attached to the stator 10. Because the projections 17 are provided, the projected area of the lead-out part 6 in the radial direction is increased, and the molding pressure in the radial direction applied to the lead-out part 6 during molding is also increased. If the molding pressure in the radial direction increases, the lead wiring part 1 is pressed in the radial direction with a greater force. As a result, the lead wiring part 1 can be brought into contact with the mold and positioned in the radial direction.

Further, the lead-out part 6 includes locking portions for retaining two types of lead retaining parts: locking portions 26a for retaining the power-lead retaining part 4 and locking portions 26b for retaining the sensor-lead retaining part 5. The projections 17 described above are connected to the locking portions 26b.

FIG. 15 is a view illustrating the power lead retaining part 4. The power lead retaining part 4 includes legs 41 to be hooked onto the locking portions 26a of the lead-out part 6. Each of the legs 41 is provided with a projection 41a at the tip. The projections 41a come into contact with the locking portions 26a so that the power-lead retaining part 4 can be axially positioned. After the power leads 8 are laid on the lead-out part 6, the legs 41 are locked to the locking portions 26a of the lead-out part 6, whereby the power-lead retaining part 4 is attached. Further, as illustrated in FIG. 11, the power lead retaining part 4 is inserted from the central side of the lead wiring part 1 toward the outside, and thereby attached. At this time, because the lead retaining projections 44 of the lead wiring part 1 retain the power leads 8, the lead-out part 6 does not need to retain the power leads 8. Accordingly, the lead-out part 6 does not need to include projections or the like for retaining the power leads 8 when attaching the power lead retaining part 4, whereby the lead-out part 6 can be reduced in size, and the distance between the lead wiring part 1 and the lead-out part 6 can be ensured. This enables an improvement in the ease of attaching the power lead retaining part 4 to the lead-out part 6.

FIG. 16 is a view illustrating the sensor lead retaining part 5. The sensor lead retaining part 5 includes L-shaped legs 51 to be hooked onto the locking portions 26b of the lead-out part 6. The sensor-lead retaining part 5 is locked to the locking portions 26b of the lead-out part 6 on which the sensor leads 7 are laid, whereby the sensor-lead retaining part 5 is attached to the lead-out part 6.

In the stator assembly 30 in the present embodiment, the sensor leads 7 and the power leads 8 are respectively routed on different surfaces of the lead wiring part 1. Specifically, the sensor leads 7 are routed on the surface on the counter-stator side of the lead wiring part 1 (the side illustrated in FIG. 2) and the power leads 8 are routed on the surface on the stator side of the lead wiring part 1 (the side illustrated in FIG. 3). This facilitates assembling and enables a reduction in assembling cost. The facilitation of assembling enables an improvement in quality. Furthermore, the power leads 8 are prevented from being axially displaced by retaining the power leads 8 with the projections 22a provided on the surface on the stator side. This enables an improvement in quality.

Moreover, the lead wiring part 1 includes two types of locking portions: the locking portions 26a and the locking portions 26b. The locking portions 26a retain the power leads 8, and the locking portions 26b retain the sensor leads 7. Thus, the leads can be firmly attached to the lead wiring part 1. This enables an improvement in reliability and, accordingly, in quality. Furthermore, by using the legs 41 of the power-lead retaining part 4 also for retaining the sensor leads 7, assembling can be facilitated and the cost can be reduced. The facilitation of assembling enables an improvement in quality.

With such a configuration, the lead wiring part 1 on which the sensor leads 7 and the power leads 8 are laid is attached to the stator 10 of the electric motor, and the pins 81 of the insulating portion 83 of the stator 10 projecting from the attaching legs 13 of the lead wiring part 1 are secured by thermal welding, ultrasonic welding, or the like, whereby the stator assembly 30 to which the sensor leads 7 and the power leads 8 are attached is obtained (FIG. 1).

A molded stator 60 illustrated in FIG. 17 is obtained by molding a mold resin, such as a thermoplastic resin, an example of which is a BMC (bulk molding compound), onto the stator assembly 30 illustrated in FIG. 1. Furthermore, by embedding a rotor (not illustrated) and a bracket 74 into an opening 62 of the molded stator 60, a molded electric motor 70 illustrated in FIG. 18 and FIG. 19 is obtained.

As described above, the lead wiring part 1 and the lead-out part 6 are individual components and are separated from each other by a given distance; therefore, wall portions 16 provided on the lead wiring part 1 and the projections 17 provided on the lead-out part 6 are also separated from each other. Accordingly, water is prevented from infiltrating through the interface between the lead lead-out portion 2 and the mold resin. This enables an improvement in the quality of the molded stator 60.

Further, as described above, the lead-out part 6 includes the projections 17 extending from the ends in the circumferential direction toward the lead wiring part 1 and by a given distance in the circumferential direction. Each of the projections 17 includes a flat portion on the radially outer side, which is to be substantially perpendicular to the radial direction of the stator 10. Accordingly, when the molded stator 60 is molded, the lead lead-out portion 2 of the stator assembly 30 is pushed radially outward from the center of the stator 10 by the pressure during molding. In this case, the lead lead-out portion 2 is kept in position without coming into contact with the stator core 82. Consequently, during molding, the respective leads are prevented from being fixed in a state of being in contact with each other, and no void is formed at the portions generated when respective leads are in contact with each other. Thus, even if water infiltrates through a gap or interface between the lead lead-out portion 2 and the mold resin, an event where the water reaches the substrate 11 by passing through the void between the respective leads is prevented. This enables an improvement in the quality of the molded stator 60.

Further, when the stator 10 is placed in the mold, the projections (not illustrated) formed on the counter-connection side of the insulating inner wall 83*b* are supported by a mounting portion formed on the mold. Examples of this mounting portion are a stepped portion having an outer diameter slightly larger than the inner diameter of the stator core 82; a plurality of claws extending as projections from the installation surface of the opening of the mold core metal portion toward the stator 10 side; and a plurality of projections extending from the bracket installation surface near the mold core metal portion such that they are not connected to the inner circumference of the stator core 82.

As described above, because the stator 10 is supported by the mounting portion of the mold, there is no need to support the outer circumference portion of the stator 10 with the mold (regulating member) during molding. Consequently, the outer cover of the molded stator 60 does not have an interface formed between the stator core 82 and the mold resin.

Further, in a case where projections of the mold are used for supporting the stator 10, when the molded stator 60 is placed in the mold, the projections (not illustrated) formed on the counter-connection side of the insulating inner wall 83*b* are not exposed on the inner diameter side of the stator core 82. This enables a further improvement in the effect of suppressing water infiltration.

In FIG. 18 and FIG. 19, the shaft 72, a watertight cap 71, and an E-ring 73 of the rotor are attached to the molded stator 60 by using the bracket 74. The watertight cap 71 prevents water from entering from a gap between the shaft 72 and the bracket 74. Consequently, it is possible to obtain the molded electric motor 70 that allows an increase in productivity and a resulting improvement in quality and that allows a reduction in cost.

Next, the manufacturing process of the molded electric motor 70 will be explained with reference to FIG. 20.

(1) Step 1: The stator core 82 is manufactured. The lead wiring assembly 40 and the lead wiring part 1 are also manufactured.

(2) Step 2: The windings 84 are wound on the stator core 82. The power leads 8 of the lead wiring assembly 40 are also laid on the lead wiring part 1. At this point in time, the core wires of the power leads 8 are routed to the core-wire retaining portions 24. The power-lead retaining part 4 is also manufactured.

(3) Step 3: The power-lead retaining part 4 is attached to the lead wiring part 1. The substrate 11 is also manufactured.

(4) Step 4: The substrate 11 is attached to the lead wiring part 1. The contacts of the housing 80 are soldered to the substrate 11 attached to the substrate retaining portion 15. The sensor-lead retaining part 5 is also manufactured.

(5) Step 5: The sensor-lead retaining part 5 is attached to the lead wiring part 1.

(6) Step 6: The lead wiring part 1 is attached to the stator 10, the pins 81 projecting from the attaching legs 13 of the lead wiring part 1 are thermally welded, and the terminals 12 of the stator 10 and the core wires of the power leads 8 are spot welded.

(7) Step 7: A resin is molded onto the stator assembly 30 so as to manufacture the molded stator 60. Parts, such as the rotor and the bracket 74, are also manufactured. Here, before a resin is molded onto the stator assembly 30, the lead wiring part 1 and the lead-out part 6 are separated from each other by cutting the connection portion between the lead wiring part 1 and the lead-out part 6.

(8) Step 8: The rotor and the like are attached to the molded stator 60 so as to manufacture the molded electric motor 70.

FIG. 21 illustrates an air conditioner 100 that incorporates the molded electric motor 70 according to the present embodiment of the present invention. The air conditioner 100 includes an indoor unit 200 and an outdoor unit 300 connected to the indoor unit 200. The molded electric motor 70, which is a driving source for a fan, is provided in each of the indoor unit 200 and the outdoor unit 300. When the molded electric motor 70 is installed in each of the indoor unit 200 and the outdoor unit 300, a plurality of attaching legs 61 (see FIG. 17) extending radially outwardly from the outer circumferential side of the molded stator 60 are used. The molded electric motor 70 is used as an electric motor for a fan, which is a main part of the air conditioner 100, in such a manner; therefore, water can be prevented from entering the stator of the electric motor for a fan. Therefore, it is possible to obtain the air conditioner 100 that is low in cost and is of good quality.

As described above, the stator for an electric motor according to the present embodiment includes the annular lead wiring part 1, on which the power leads 8 and the sensor leads 7 are laid; and the lead-out part 6 provided on a radially outer side of the lead wiring part 1 to lead out the leads to the outside of the molded stator 60. The wall 22 provided on the inner circumference of the lead wiring part 1 includes the flat portion 52 near the lead-out part 6. The flat portion 52 is substantially perpendicular to the radial direction of the stator, and is substantially parallel with the end portion of the lead-out part 6 in the radial direction. In this case, the lead-routing retaining position 46, at which the sensor leads 7 and the power leads 8 routed by the lead wiring part 1 are gathered, can be arranged on the inner diameter side of the lead wiring part 1 in the radial direction. As a result, the distance between the lead wiring part 1 and the lead-out part 6 is ensured, whereby the lead wiring part 1 and the lead-out part 6 are prevented from coming into contact with each other. Thus, the water infiltration resistance is improved. Further, this enables an improvement in the ease of attaching the power lead retaining part 4, which needs to be attached to the lead-out part 6 from the central side of the lead wiring part 1.

Further, the flat portion 52 of the lead wiring part 1 includes the recess 53. Accordingly, when one of the power leads 8 is routed to the lead-end retaining portion 14 that is farthest from the lead-out part 6, this power lead 8 can be once routed on the inner diameter side of the lead wiring part 1 in the radial direction, and then bent and routed toward that lead-end retaining portion 14. This enables an improvement in the ease of routing the power leads 8.

The configurations illustrated in the above embodiment are mere examples of the content of the present invention, and they may be combined with other known techniques. Further, the configurations may be partly omitted or changed without departing from the spirit of the present invention.

The invention claimed is:

1. A stator for an electric motor, comprising:
   an annular lead wiring part attached to one axial end of the stator and routing a power lead to a terminal of the stator through a lead lead-out portion; and
   a lead-out part provided on a radially outer side of the annular lead wiring part and leading out the power lead to a radial outside of the lead wiring part, wherein
   an inner wall is formed on an inner circumference of the lead wiring part, and
   the inner wall of the lead wiring part includes a flat portion, and the flat portion includes a recess in the axial direction of the lead wiring part adjacent the lead-out part,
   wherein the annular lead wiring part includes a positioning portion to be used for positioning during molding that is performed after the annular lead wiring part is attached to the stator, and
   wherein the positioning portion is located on the inner side of the inner diameter of the stator.

2. The stator for an electric motor according to claim 1, wherein an outer cover is formed from a molded resin.

3. An electric motor that uses the stator for an electric motor according to claim 1.

4. An air conditioner that includes the electric motor according to claim 3 as an electric motor for a fan.

5. The stator for an electric motor according to claim 1, wherein the positioning portion includes an insertion hole.

6. The stator for an electric motor according to claim 1, wherein the positioning portion includes a projection.

* * * * *